Feb. 7, 1939. H. A. HUSTED 2,146,703
STEERING WHEEL
Filed July 23, 1934 2 Sheets-Sheet 1

INVENTOR
Harry A. Husted,
BY
Justin W. Macklin
ATTORNEY

Feb. 7, 1939.  H. A. HUSTED  2,146,703
STEERING WHEEL
Filed July 23, 1934  2 Sheets-Sheet 2

INVENTOR.
Harry A. Husted,
BY
Justin W. Macklin
ATTORNEY.

Patented Feb. 7, 1939

2,146,703

UNITED STATES PATENT OFFICE 2,146,703

STEERING WHEEL

Harry A. Husted, Lakewood, Ohio, assignor, by mesne assignments, to Thermo-Plastics, Incorporated, St. Clair, Mich., a corporation of Michigan Application July 23, 1934, Serial No. 736,484

9 Claims. (Cl. 74—552)

This invention relates to a steering wheel for motor vehicles and to a method of making the same, and particularly to a wheel of the type having a metallic frame work covered with molded plastic composition. Wheels of this general type are now in wide use but as compared to the wheel of the present invention, these wheels are expensive to manufacture, requiring much larger amounts of material both for the frame and for the covering, and requiring very much longer time in the mold for curing the covering. In addition these wheels require buffing and polishing after they are removed from the mold.

It is an object of the present invention to provide an improved steering wheel which can be manufactured very economically.

A further object of the invention is to provide a steering wheel having a framework constructed largely of hollow tubular members, the outline of the framework approximating that of the completed wheel so that only a relatively thin layer of plastic material need be applied over the framework to provide a completed wheel which is attractive in appearance.

Another object of the invention is to provide a wheel of the type described and which will require a minimum of plastic composition, thus permitting the use of comparatively expensive materials having most desirable characteristics of toughness, resiliency, high polish surface, and various colors.

A further object of the invention is to provide a wheel of the type referred to which can have the coating applied thereto very quickly.

A further object of the invention is to provide a wheel having a framework constructed largely of hollow tubular members, the members of which can be easily and cheaply manufactured, and readily assembled and secured together.

The embodiment of the invention shown herein may be made by the method disclosed and claimed in my Patent No. 2,043,584, issued June 9th, 1938, on an application filed as a division and continuation of the present application. Said patent relates in part to a method of covering a metallic core or framework with plastic composition, by steps comprising preparing a rigid frame, placing the frame in a mold cavity with the frame spaced from the walls of the cavity and forcing the plastic composition into the mold cavity under pressure so that it flows around the frame and fills the spaces intermediate the frame and the mold.

Other objects of the invention and features of novelty will be apparent from the following description taken in connection with the accompanying drawings in which.

Figure 3:
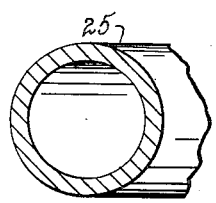
Figure 4:
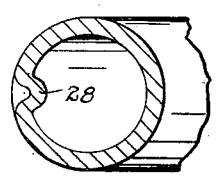
Figure 5:
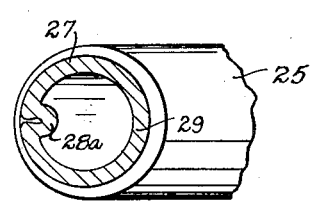

Figs. 3, 4, and 5 show rim sections indicating the steps of reducing a short sector of the rim at the spoke joint.

Figure 6:
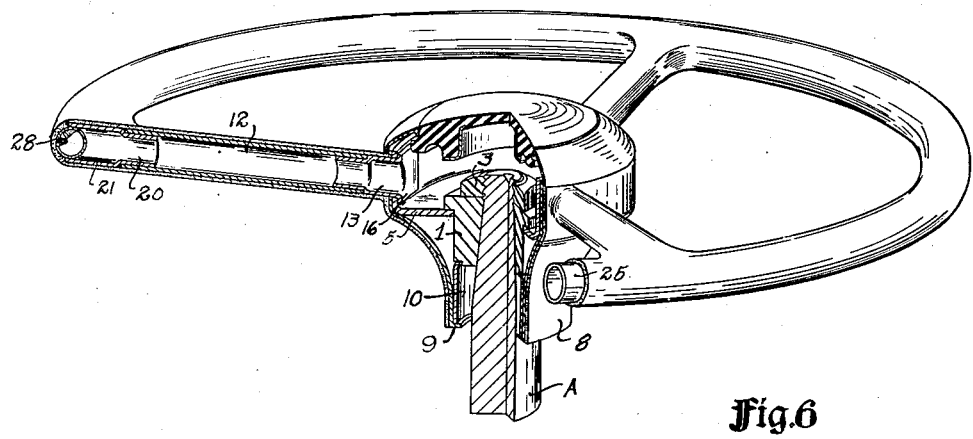

Fig. 6 is a perspective view of my steering wheel having a portion cut away along one spoke showing the rim and hub partially in section.

Figure 7:
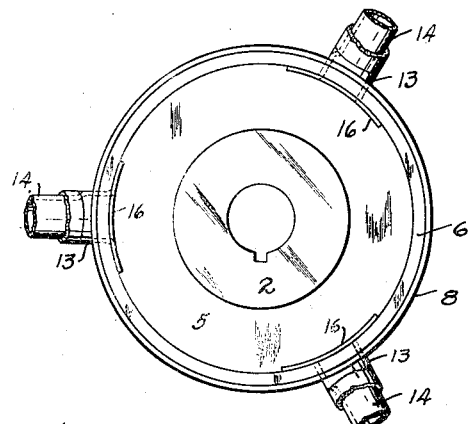

Fig. 7 is a fragmentary plan of the hub showing the spoke connections therewith.

Figure 8:
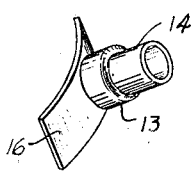

Fig. 8 is a perspective view showing one of the elements for connecting the spokes to the hub.

Figure 9:
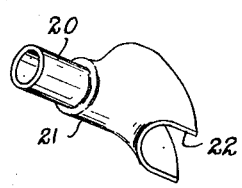

Fig. 9 is a similar view of one of the elements connecting the spoke tubes to the rim.

Figure 1:
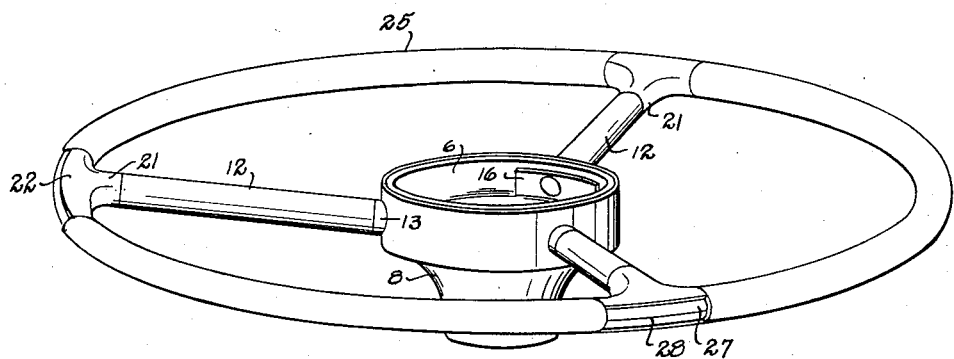
Fig. 1 is a perspective view of the metallic tubular spider comprising rim, spokes, and hollow hub of my steering wheel.
Figure 2:
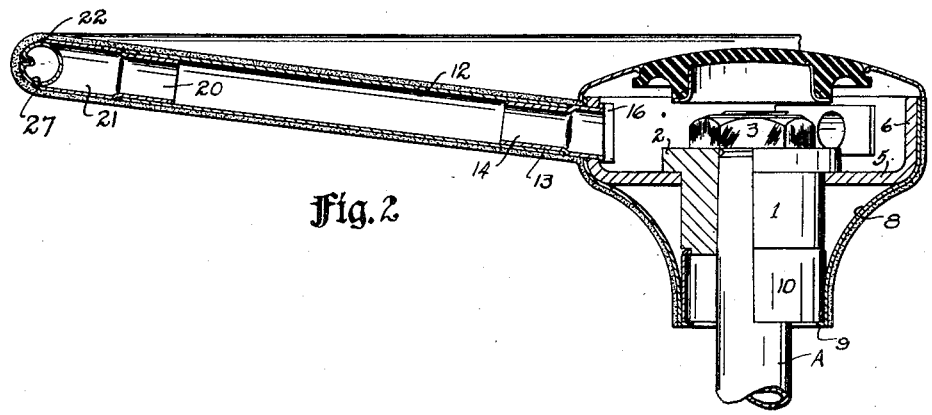
Fig. 2 is a sectional view through the hub and one of the spokes.

My steering wheel of course is adapted to be placed upon the usual steering column such as indicated at A Fig. 2, and which may be that of an automobile or the steering spindle or column of an airplane, motor boat, or other vehicle. Adapted to embrace such steering column is a tapered hub collar 1, shown as having an enlarged head or flange 2, against the upper surface of which is fitted a securing nut 3, and which may have the usual tapered bore by which the collar may be tightly pressed by the nut 3 onto the steering column A. The method of attaching the steering wheel may vary to suit conditions, for example, in my United States Letters Patent No. 2,001,349 issued May 14, 1935, on a Steering wheel and identification means, I have there shown a somewhat similar but non-removable hub attachment.

Referring to the construction here shown, embracing the collar 1, and fitted beneath the flange 2 is an outwardly extending disk 5 of substantially greater thickness than the metal of the spokes and rim, and having an upwardly extending cylindrical flange 6. This disk is preferably welded or similarly secured to the collar 1 and its flange 2. The flange 6 is provided with an opening for the inner end of each spoke as will presently appear. To complete the hub and give it a somewhat conical conventional appearance and also to avoid waste of the plastic coating later to be applied, I provide a hub casing member 8 shown as fitted over the flange 6 and as extending inwardly and downwardly, and as having an inwardly turned lip or flange 9 beneath a collar 10, the upper end of which is fitted in a suitable cutway or rabbeted portion of the collar 1.

Each spoke comprises a section of metal tubing which may be cylindrical, although of course may vary in cross section if desired. This tube portion of the spokes is designated 12. A coupling member 13 connects the inner end with the hub flange 6. This coupling member is shown as having the reduced portion 14 fitted inside of the tube 12, and it extends through the flange 6 of the hub and here has laterally extending wings or lips 16 which may be welded, or in like manner, secured to the inner face of the flange 6.

At the outer ends of the spoke tubes 12 are coupling members having reduced portions 20 fitted inside of the tubes 12. The reduced portion is integral with the body 21, which is flared circumferentially of the rim, and also takes the form of a yoke as shown at 22 to embrace the reduced portion 27 of the rim tube 25. The rim tube 25 is preferably made from straight uniform standard tubing which I prefer to be seamless, but it is formed into a solid or welded ring. At intervals corresponding to the spacing of the spokes I provide reduced portions for short arcuate distances, to receive the yoke ends 22 of the outer spoke end connections. To uniformly reduce the diameter of the tube at these points I first indent a groove in the metal as indicated at 28, in Fig. 4 and then by a squeezing action reduce the diameter as indicated 28a in Fig. 5. Here it will be noted that the surplus metal caused by reducing the diameter is taken up in the inturned fold as shown at 28a, Fig. 5. Preferably this reduced portion designated generally 27 is eccentric of the rim tube 25 so that the yoke 22 may be substantially aligned with the inner surface or perimeter of the rim tube.

With each of three, four, or more spokes so assembled on the rim and hub, a hollow steering wheel spider is thus formed, and while it is maintained in its final form with the spokes at the proper slope or angle with relation to the axis, it is treated with the welding or brazing process, finishing all joints in one operation. While this may be done by now known electric welding processes, I prefer coating the joints by a treatment, somewhat like brazing, then giving the wheel a single heat application, by passing the spider through a furnace, whereby it may have all parts effectively and rigidly inter-connected in one such operation. The hollow metal spider so formed is substantially of finished shape and of very nearly the size, in cross sectional diameters of spokes, rim and hub, of the finished wheel. In preparation for the so-called welding, a fusing material is forced into the joints at the flanges 16, reduced portions 14 and 20 and yoke 22, by a metal spraying gun, thus assuring thorough union and filling the joints. It is very uniform and presents no abrupt corners, no depressions to be filled by the plastic material other than the slight variations in the joint surface as at the outer spoke connection with the rim.

I claim:

1. An automobile steering wheel having a metallic frame covered with a molded plastic composition, the frame comprising a hollow hub, metal tubes secured thereto and radiating therefrom to form the spokes, a metallic tube formed into a continuous ring and secured to the end of the spokes, said ring having short annular reduced sections opposite the ends of the spokes and a connecting means fitted over the reduced sections and flush with the surface adjacent the reduced sections.

2. A spider for a coated steering wheel comprising a continuous imperforate tubular rim, tubular spokes, a connecting member between the spokes and rim, each of said members comprising an element having a portion telescoped with one of the spoke members and a yoke for embracing the tubular rim, the tubular rim being folded inwardly at intervals along longitudinal folds and providing surfaces on the rim reduced in diameter with respect to the normal cross sectional diameter of the rim to receive the yoke, said yoke having portions overlying said reduced diameter portions of the rim and providing substantially the same cross sectional diameter as the normal cross sectional diameter of the rim for permitting substantially uniform thickness of the coating at the connection of the yoke and rim.

3. A spider for a coated steering wheel comprising a tubular rim and tubular spokes adapted to be rigidly connected thereto, means telescoping the ends of said spokes for effecting such connection comprising an element having a yoke for embracing the rim tube, said rim tubing being reduced in diameter to receive the yoke substantially within the thickness of the rim, and a further element having a flange secured to the hub from within.

4. An automobile steering wheel comprising a hollow metallic hub, tubular spoke members and a continuous tubular rim annulus, said rim annulus having longitudinal sections of uniformly reduced diameter formed in the inner periphery thereof, the outer periphery remaining substantially flush, yokes carried by the spoke members, flanges on the yokes embracing a portion of the sections of reduced diameter only to form a smooth flush surface therewith and rigid junction between the rim and spoke members.

5. In an automobile steering wheel having a continuous tubular rim annulus and spokes, and a hollow metallic hub, longitudinal sections of circular cross-section and of smaller diameter than the cross-section of the tubular rim formed at intervals around the rim annulus, the circular sections being eccentric from the rim tubing and thereby providing shoulders on the inner peripheral surface of the rim at the ends of the sections, yoke members telescopically secured to the spokes, semi-cylindrical flanges on the yokes embracing the said sections and lying between the shoulders whereby to produce a strong connection the surface defined by the flanges being flush with the rim.

6. A steering wheel frame for the purposes described, comprising a continuous imperforate tubular rim, spokes therefor, the rim having reduced diameter portions of circular cross section, said portions being eccentric to the rim cross section and having surfaces substantially flush with the outer normal periphery of the rim, yoke members extending inwardly from the rim, each of said members having flanges at the outer end partially embracing one of said reduced diameter portions and fixed thereto with the free ends of the flanges in spaced relation to said substantially flush surfaces and defining a substantially cylindrical surface, and means on the yoke engaging the spokes and fixedly secured thereto, and hub means connected to the inner ends of the spokes.

7. In a steering wheel frame for the purposes described, a rim, a plurality of radial tubular spokes connected at their outer ends to the rim, a hub having an axially extending annular flange portion, said spokes abutting said flange at their inner ends, said flange having holes aligned with the spokes, elements passing through said holes and into telescoping relation with the spokes and snugly fitting and fixed therein, arcuate flange means on the inner ends of the elements substantially in juxtaposition with the interior wall surface of the flange portion and being fixedly secured thereto for mounting the spokes on the hub.

8. A hollow imperforate steering wheel frame capable of receiving a thin uniform coating of thermoplastic material applied under several thousand pounds per square inch pressure, said frame comprising a hollow metallic hub, spokes of seamless tubing, and a continuous rim annulus of seamless tubing of circular cross section, said rim annulus having circumferentially spaced portions with the outer peripheral wall folded inwardly upon itself with the fold extending circumferentially of the annulus and rendering said portions substantially flush with the outer peripheral surface of the annulus adjacent the fold and of less cross sectional diameter than said annulus, tubular yoke members extending inwardly from the rim, each of said tubular yoke members having flanges at the outer end partially embracing one of said circumferentially spaced portions and fixed thereto with the free ends of the flanges in spaced relation to said flush surfaces and defining a cylindrical surface of substantially the same diameter as and providing a continuation of the full diameter portion of the rim, and means on the yoke telescopically engaging the spokes and fixedly secured thereto, and further means connecting the hub to the inner ends of the spokes.

9. A spider for a steering wheel rim, comprising a continuous imperforate tubular rim, imperforate tubular spokes, portions of the rim being reduced in diameter by a longitudinal fold of the metal and providing a portion of reduced diameter circular cross section substantially flush with the outer periphery of the rim, tubular yoke members extending inwardly from the rim, each yoke member having flanges at the outer end which partially embrace said portion and terminate in spaced relation to said flush surface and define at said portions cylindrical surfaces providing a continuation of the full diameter portion of the rim and of substantially the same diameter, and means on the yoke telescopically engaging the spokes and fixedly secured thereto, hub means connected to the inner ends of the spokes, and a relatively thin coating of thermoplastic material substantially uniformly coating said rim and spokes and substantially conforming in exterior contour thereto.

HARRY A. HUSTED.